(12) United States Patent
Clark et al.

(10) Patent No.: US 10,834,199 B2
(45) Date of Patent: Nov. 10, 2020

(54) CLOUD AUTHORIZED VEHICLE CONTROL

(71) Applicant: Ford Global Technologies, LLC, Dearborn, MI (US)

(72) Inventors: Karl Nathan Clark, Belleville, MI (US); Jason Michael Miller, Woodhaven, MI (US); Xin Ye, Farmington Hills, MI (US); James Michael Weinfurther, Farmington, MI (US); Vijayababu Jayaraman, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 163 days.

(21) Appl. No.: 16/133,875

(22) Filed: Sep. 18, 2018

(65) Prior Publication Data

US 2020/0092375 A1 Mar. 19, 2020

(51) Int. Cl.
| | |
|---|---|
| *H04L 29/08* | (2006.01) |
| *H04W 4/40* | (2018.01) |
| *G07C 9/00* | (2020.01) |
| *H04L 9/32* | (2006.01) |

(52) U.S. Cl.
CPC ........ *H04L 67/125* (2013.01); *G07C 9/00309* (2013.01); *H04L 9/3249* (2013.01); *H04L 9/3252* (2013.01); *H04W 4/40* (2018.02); *G07C 2009/00547* (2013.01); *G07C 2009/00555* (2013.01)

(58) Field of Classification Search
CPC ... H04L 67/125; H04L 9/3249; H04L 9/3252; H04L 9/3247; H04L 2209/84; G07C 9/00309; G07C 2009/00555; G07C 2009/00547; H04W 4/40; H04W 4/44; H04W 4/025; G06F 21/52; B60R 25/00
USPC .......................................................... 701/36
See application file for complete search history.

(56) References Cited

U.S. PATENT DOCUMENTS

| | | | |
|---|---|---|---|
| 2008/0266051 A1 | 10/2008 | Taki et al. | |
| 2014/0380442 A1* | 12/2014 | Addepalli | ............... H04L 45/12 726/6 |
| 2015/0163306 A1 | 6/2015 | Nakagawa | |
| 2016/0234186 A1 | 8/2016 | Leblond et al. | |

* cited by examiner

*Primary Examiner* — Brian P Sweeney
(74) *Attorney, Agent, or Firm* — Michael Spenner; Brooks Kushman PC

(57) ABSTRACT

A vehicle includes a controller, programmed to responsive to receiving a command from a non-customer party, send an authorization request based on the command and a predefined vehicle parameter to a server; and responsive to receiving a signed command from the server, execute the signed command.

16 Claims, 4 Drawing Sheets

CLOUD AUTHORIZED VEHICLE CONTROL

TECHNICAL FIELD

The present disclosure is generally related to a vehicle command authentication system. More specifically, the present disclosure is related to a vehicle system for requesting and receiving a signed command authorized by a cloud system.

BACKGROUND

Many vehicles are provided remote control features allowing the vehicles to receive commands to perform various functions such as remote start and remote software update. However, the remote control features may be vulnerable to commands from an unauthorized party. An unauthorized user could post an unauthorized remote start command onto the vehicle network, such that the vehicle would receive and execute the command without regard to its authenticity.

SUMMARY

In one or more illustrative embodiments of the present disclosure, a vehicle includes a controller, programmed to responsive to receiving a command from a non-customer party, send an authorization request based on the command and a predefined vehicle parameter to a server; and responsive to receiving a signed command from the server, execute the signed command.

In one or more illustrative embodiments of the present disclosure, a method for a vehicle includes detecting a non-customer-initiated command induced by a controller within the vehicle responsive to a pre-condition being met; generating an authorization and authentication request based on the non-customer-initiated command; sending the authorization and authentication request to a server; receiving a signed command authorizing and authenticating the non-customer-initiated command; and executing the signed command.

In one or more illustrative embodiments of the present disclosure, a vehicle system includes a controller programmed to, responsive to receiving a data file wirelessly from a non-customer party, send an authorization and authentication request based on the data file to a server which is independent from the non-customer party, and responsive to receiving a signed command from the server, distribute the data file to an ECU.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle remote command authorization system. A customer-initiated command may include a command received by an owner or other authorized user of the vehicle. Typically, such commands are sent from the customer for execution by the vehicle. Commands from customers typically are sent from an authenticated device, therefore additional verification is unnecessary. In contrast to such commands, the present disclosure proposes a vehicle system for authorizing and authenticating a non-customer-initiated command via a cloud before executing the command on the vehicle. For instance, the non-customer-initiated command may include a command received from a vehicle manufacturer or a dealer.

Figure 1:
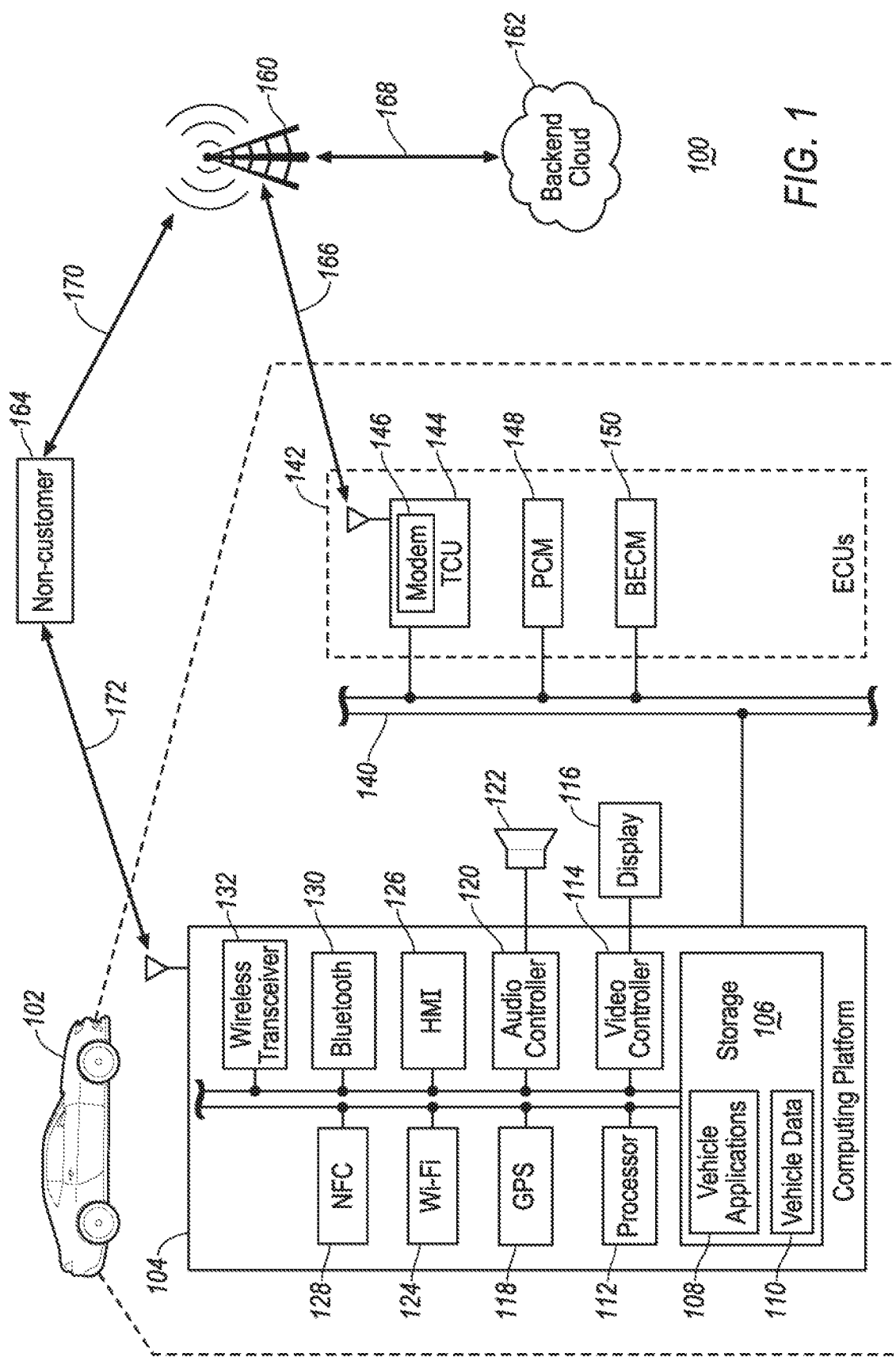
FIG. 1 illustrates an example block topology of a vehicle system of one embodiment of the present disclosure.

Referring to FIG. 1, an example block topology of a vehicle command authorization and authentication system 100 of one embodiment of the present disclosure is illustrated. The vehicle 102 may include various types of automobile, crossover utility vehicle (CUV), sport utility vehicle (SUV), truck, recreational vehicle (RV), shuttle bus, boat, plane, or other mobile machine for transporting people or goods. In many cases, the vehicle 102 may be powered by an electric motor. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the vehicle 102 may include the SYNC system manufactured by The Ford Motor Company of Dearborn, Mich.

As illustrated in FIG. 1, a computing platform 104 of the vehicle 102 may include one or more processors 112 configured to perform instructions, commands, and other routines in support of the processes described herein. For instance, the computing platform 104 may be configured to execute instructions of vehicle applications 108 to provide features such as navigation, remote command processing, authorization and authentication. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 126 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120. The computing platform 104 may also be provided location features through location controller such as a global positioning system (GPS) controller 124 configured to communicate with multiple satellites to calculate the location of the vehicle 102. It is noted that the location controller may be configured to support other radio navigation systems used in various parts of the world, including GALILEO, GLONASS, and Beidou navigation satellite systems for instance.

The computing platform 104 may be further provided with a wireless transceiver 132 in communication with a WiFi controller 124, a near-field communication (NFC) controller 128, a Bluetooth controller and other controllers such as a Zigbee transceiver, an IrDA transceiver (not shown), configured to communicate with compatible wireless transceivers of various devices.

The computing platform 104 may be further configured to communicate with various electronic control units (ECUs) 142 via one or more in-vehicle network 170. The in-vehicle network 140 may include, but is not limited to, one or more of a controller area network (CAN), an Ethernet network, and a media oriented system transport (MOST), as some examples.

The computing platform 104 may be in communication with multiple ECUs 142 configured to control and operate various functions of the vehicle 102. As a few non-limiting examples, the ECUs 142 may include a telematics control unit (TCU) 144 configured to wirelessly connect to a wireless network 160 via a modem 146 through a wireless connection 166; a powertrain control module (PCM) configured to control the powertrain including the engine/electric motor and transmission of the vehicle 102; and a battery electric control module (BECM) 150 configured to control the operation of vehicle batteries. For instance, the vehicle 102 may include a conventional lead-acid battery configured to provide power to various electric components, and a high-power traction battery in case that the vehicle 102 is an electric powered vehicle both monitored and controlled by the BECM 150.

The TCU 144 may be configured to communication with various parties via the wireless network 160 through the wireless connection 166. For instance, the TCU 144 may be configured to communicate with a non-customer 164 and a backend cloud 162 via the wireless network 160. The non-customer 164 may further communicate with the computing platform 104 directly via the wireless transceiver 132 through a wireless connection 172. The non-customer 164 may be a vehicle manufacturer or a vehicle dealer associated with the vehicle 102. The non-customer 164 may be authorized to communicate with the vehicle 102 to transfer various commands and data files (non-customer-initiated data/command) to perform functions such as vehicle software update, remote door lock/unlock commands, remote start commands and the like. For security reasons, data received from the non-customer 164 may be encrypted and the computing platform 104 may be configured to decrypt the data. Additionally or alternatively, the vehicle 102 may be further provided with an encryption controller (not shown) in communication with the computing platform 104 and configured to perform encryption and decryption to data sent to or received from various parties.

The computing platform 104 may be further configured to perform authorization and authentication via the backend cloud 162 before allowing the non-customer-initiated command and data to be executed or distributed to a target ECU. For instance, responsive to receiving the data from the non-customer 164, the computing platform 104 may request to authenticate the data via the backend cloud 162 using the TCU 144 through the wireless network 160. The backend cloud 162 may include one or more computers and servers operated by a vehicle manufacturer or an authorized party configured to perform authorization and authentication responsive to receiving vehicle requests. Responsive to a successful authorization and authentication, the backend cloud 162 may send a signed command back to the vehicle 102. The vehicle 102 may be configured to execute the signed command, but not commands that are unsigned or that are incorrectly signed.

Figure 2:
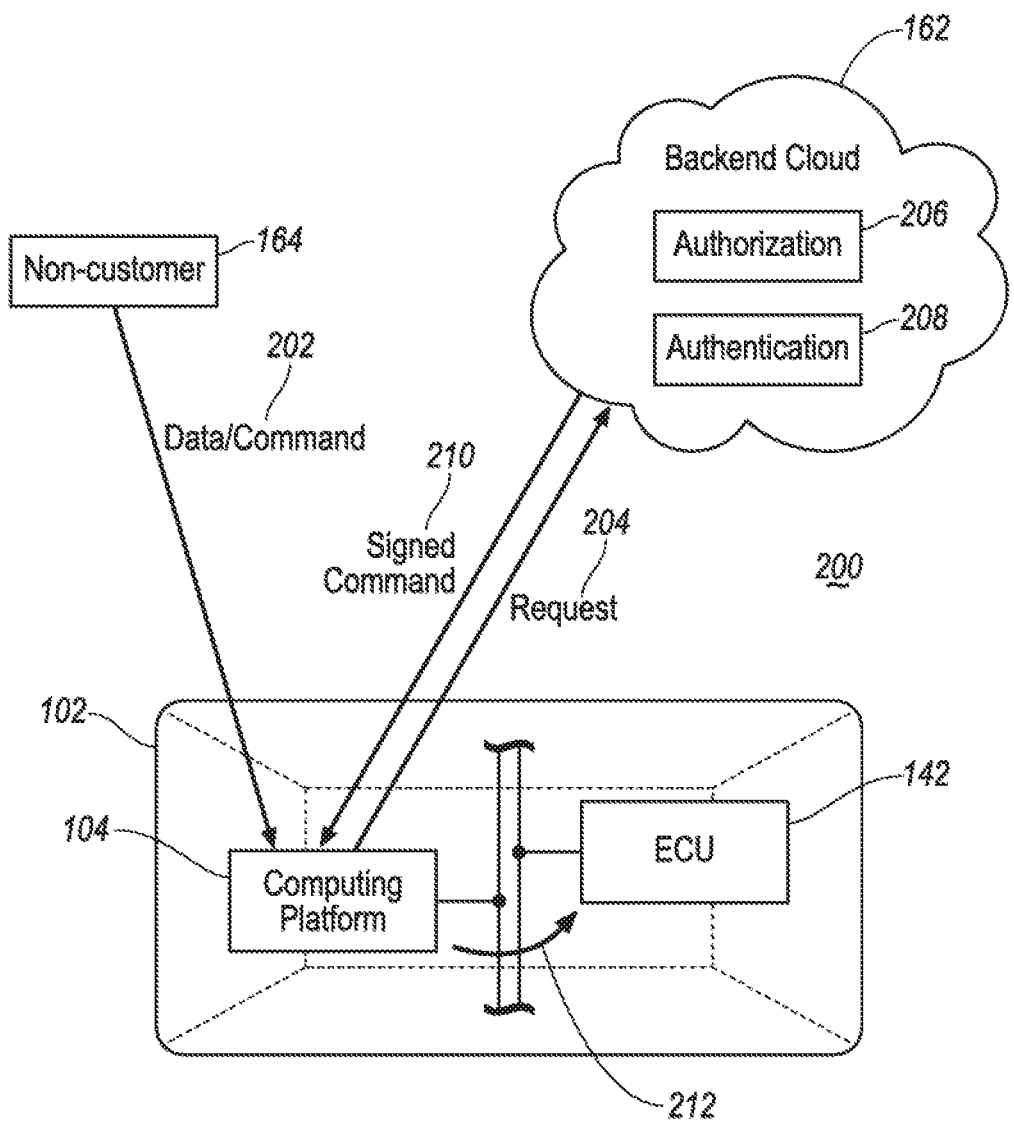
FIG. 2 illustrates an example bock diagram of a vehicle command authorization and authentication system of one embodiment of the present disclosure.

Referring to FIG. 2, an example block diagram of the vehicle command authorization and authentication system 200 is illustrated. As a general example for the operation of the vehicle command authorization and authentication system 200, the computing platform 104 of the vehicle 102 may receive the non-customer-initiated data 202 from the non-customer 164 through wireless transmission. The non-customer-initiated data, for example, may be an encrypted software update including commands and files for the target ECU 142 by the vehicle or part manufacturer associated with the vehicle 102 or the target ECU 142. However, due to the wireless nature of the vehicle configuration, it is also possible that non-customer-initiated data is sent from an unauthorized party such as a hacker. The non-customerinitiated data may contain unauthorized commands and compromised files containing malware and virus which may potentially cause damages to the target ECU 142 as well as other components of the vehicle 102. Alternatively, the non-customer-initiated data may be sent from an unauthorized shop containing unapproved software update which may be potentially dangerous to use. Therefore, authentication and approval are needed. To verify the authenticity of the data received from the non-customer 164, the computing platform 104 may send an authorization and authentication request 204 to the backend cloud 162 and ask to issue a signed vehicle command. For security reasons, the computing platform 104 may be configured to not to execute or distribute any non-customer-initiated data unless the signed command from the backend cloud 162 is received verifying the authenticity of the non-customer-initiated data.

As another alternative example, the non-customer-initiated command may be self-induced by an ECU 142 within the vehicle 102 via a triggering mechanism such as a timer and/or other pre-condition set in the software. For instance, responsive to detecting a new software file has been fully downloaded, the vehicle 102 may attempt to program the target ECU 142 and need to power-up the in-vehicle network 140 by triggering a commend. This vehicle self-triggered command would need to be authorized and authenticated before being executed. Therefore, responsive to the induction of the trigger, the computing platform 104 may send the trigger to the cloud for authorization and authentication before the BECM 150 executes the command to power-up.

The backend cloud 162 may generally perform an authorization 206 and an authentication 208 responsive to receiving the request 204 from the vehicle 102. At the authorization operation 206, the backend cloud 162 may verify whether the vehicle 102 is authorized to perform the requested operation (e.g., to update ECU software) using various parameters including: vehicle operation status, battery level, vehicle location and etc. For instance, the backend server 164 may use a battery charge level from the BECM 150 to determine whether the vehicle 102 has enough battery power to perform the requested operation. Responsive to a successful authorization 206, the backend cloud may further verity whether the non-customer-initiated data is authentic without being modified and it is from authorized non-customer party. Various technologies may be utilized to perform the authentication, and some non-limiting examples of those technologies including use of digital signatures, hashing, encryption, and geolocation verification. Responsive to a successful authentication, the backend cloud 162 may generate a signed command and send the signed command 210 back to the vehicle 102 for execution.

Responsive to receiving the signed command from the backend cloud, the computing platform 104 may distribute 212 the signed command to the target ECU 142 for execution to update the software. As an example, the communication between the computing platform 104 and the target ECU 142 may be implemented via ISO 15762 (CAN Transport Layer) technology, which allows existing ECUs 142 of the vehicle 102 to adopt the cloud authorization technology with minimal software changes. It is noted that, the computing platform 104 may be configured to not execute or distribute any data/command received from a non-customer party 164 directly, without requesting and receiving a signed command from the backend cloud 162.

Figure 3:
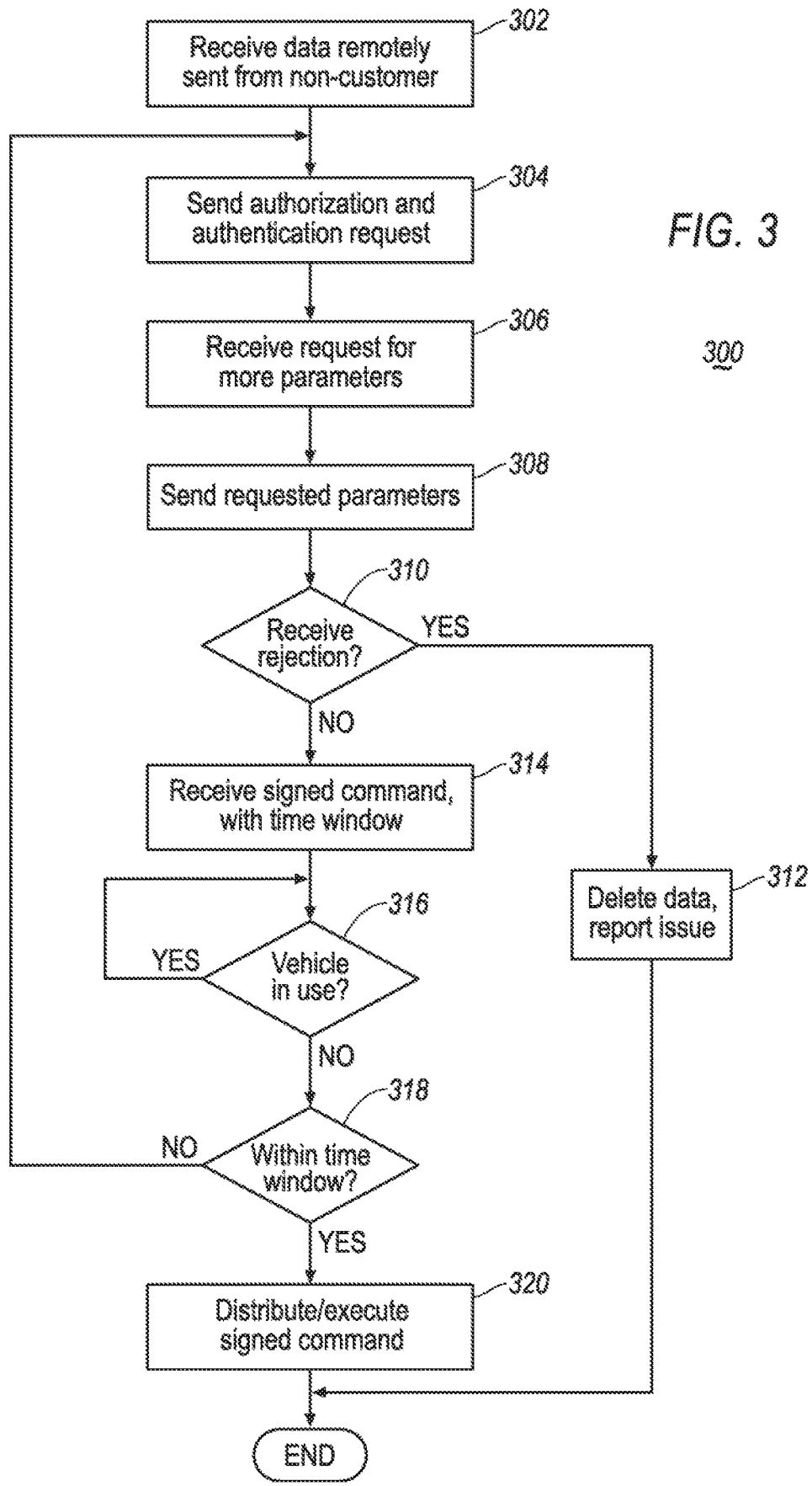
FIG. 3 illustrates an example flow diagram of the command authorization and authentication process of one embodiment of the present disclosure.

Referring to FIG. 3, an example flow diagram for a process 200 implemented on the vehicle. Although the process 200 is implemented on the computing platform 104 in the following description, it is noted that the same or substantially the same process may be fully or partially on other components of the vehicle 102 shown or not shown with reference to FIGS. 1 and 2. At operation 302, the computing platform 104 receives data/command initiated by the non-customer 164. For instance, the non-customer-initiated data may include a software update for a target ECU 142 sent from the car manufacturer or a dealer. Additionally or alternatively, the non-customer initiate data may include various commands instructing the vehicle 102 to perform various operations such as checking vehicle health, switching on power for specific vehicle components, starting the vehicle, reporting vehicle location and etc. The computing platform 104 may store the non-customer-initiated data in the storage 106 as a part of the vehicle data 110. At operation 304, the computing platform 104 sends an authorization and authentication request to the backend cloud 162. The authorization and authentication request may include information about the non-customer-initiated command, such as command ID and type, as well as information about the non-customer 164, such as the non-customer ID, IP address, location and etc. The authorization and authentication request may further include one or more predefined vehicle parameters to the backend cloud 162 for analysis purposes. Some examples of the predefined vehicle parameters may include vehicle identification number (VIN), battery charge status, vehicle location, and current vehicle operation status.

Depending on the specific non-customer-initiated command, the backend cloud 162 may request for further information about the vehicle 102 for authorization and authentication. For instance, at operation 306, the computing platform 104 receives a request for more vehicle parameters from the backend cloud 162. Taking the ECU software update for example, the backend cloud may request parameters about the current software version and event log for the target ECU 142 to determine whether to authorize and authenticate the non-customer-initiated command. In response, at operation 308, the computing platform 104 collects the requested parameters from various components of the vehicle 102 and send the requested parameters out to the backend cloud 162.

If the backend cloud 162 rejects the authorization and authentication request for any reason and the computing platform 104 receives a rejection at operation 310, the process proceeds to operation 312 and the computing platform 104 deletes the non-customer-initiated data/command from the storage 106. In addition, the computing platform 104 may report the possible security breach to authorities via the wireless network 160. If the backend cloud 162 approves the request, a signed command may be issue and sent to the computing platform 104. At operation 314, the computing platform 104 receives a signed command from the backend cloud 162. The signed command may come with a condition such as a time frame authorizing to execute the signed command within a specific period of time (e.g. 24 hours). For instance, when the computing platform 104 receives the signed command from the backend cloud 162, the vehicle 102 may be in use by a user. Operations such as updating a ECU software may only be performed while the vehicle 102 is not in use and thus cannot be performed immediately after the signed command being received.

At operation 316, the computing platform 104 determines whether the vehicle 102 is being used. This may be done by various mechanisms. For instance, the computing platform 104 may communicate with the PCM 148 and/or the BECM 150 to verify whether the vehicle 102 is in use. If the vehicle 102 is in use, the computing platform 104 waits until the vehicle 102 is no long in use and the process proceeds to operation 318. The computing platform 104 further exams whether the time is within the time frame authorized by the backend cloud 162. The computing platform 104 may be configured to allow to proceed as long as it starts to execute the signed command within the time frame. Alternatively, the computing platform 104 may further the predicted running time (e.g. an ECU update is predicted to take up to 30 minutes) into account if available so that the command execution process finishes within the approved time frame. If the authorized time frame condition cannot be met, the process returns to operation 304 and the computing platform 104 resend the authorization and authentication request to the backend cloud 162. If the time is still within the authorized time frame, the process proceeds to operation 320 and the computing platform 104 executes the signed command received from the backend cloud. If any ECU 142 is involved, the computing platform 104 further distributes the signed command to the target ECU 142 to execute.

Since the vehicle 102 may not be used during a process such as an ECU update which may last for an extended period of time causing inconvenience to the user, the computing platform may be further configured to reserve a time to perform the operation of the commanded process when it is predicted the vehicle 102 will not be used for at least the extended period of time. For instance, the computing platform may use location data from the GPS controller 118 to generate a usage pattern of the user, and only perform the operation responsive to determining the vehicle is parked near the user's home.

Figure 4:
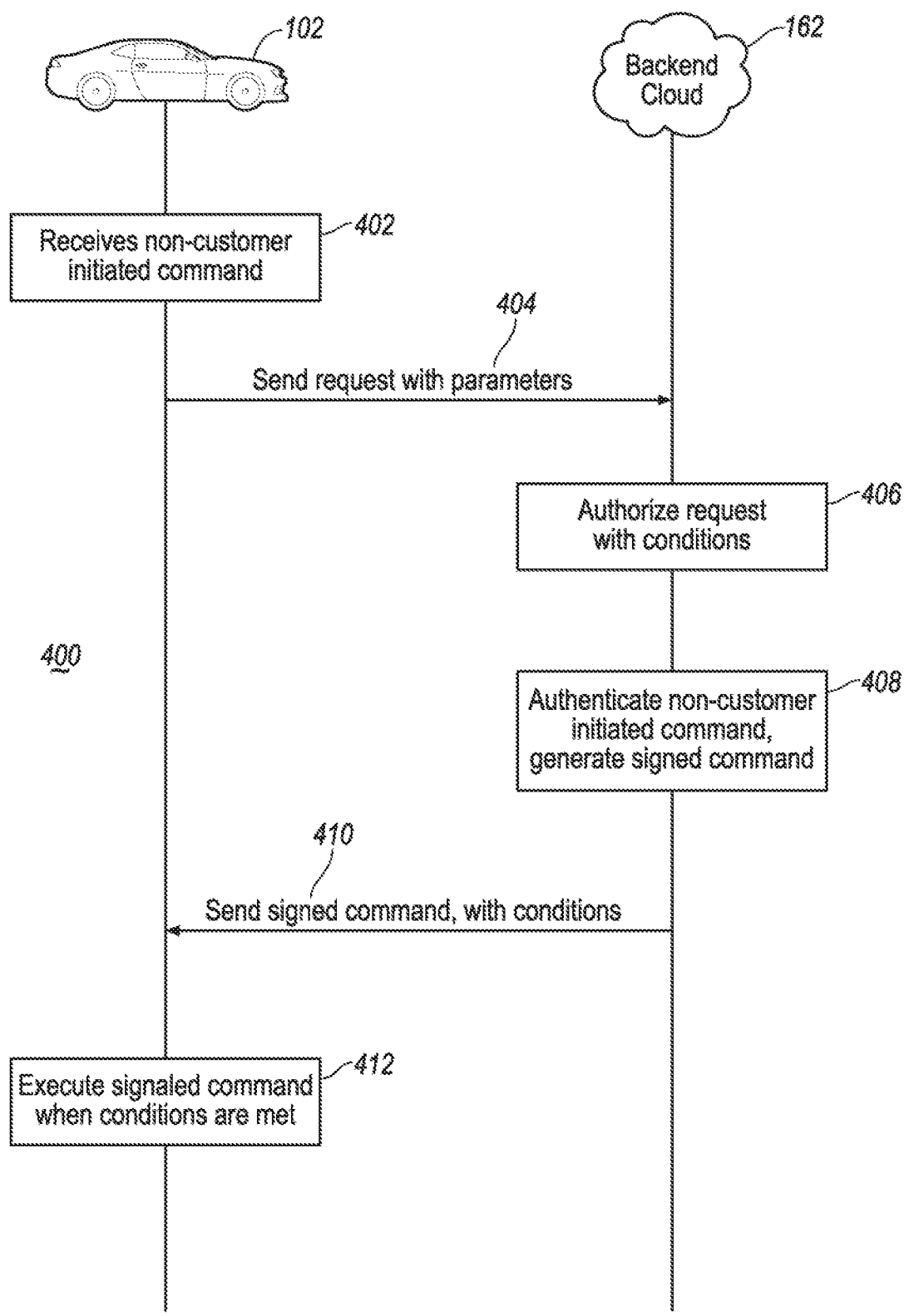
FIG. 4 illustrates an example data flow diagram between a vehicle and a cloud of one embodiment of the present disclosure.

Referring to FIG. 4, an example data flow diagram 400 between the vehicle 102 and the backend cloud 162 is illustrated. With continuing reference to FIGS. 1-3, at operation 402, the vehicle 102 receives a non-customer-initiated command. In response, at operation 404, the computing platform 104 sends an authorization and authentication request along with predefined vehicle parameters to the backend cloud 162 to obtain a signed command. Responsive to receiving the authorization and authentication request and various parameters, the backend cloud 162 evaluates the request using the various parameters. For instance, if the backend cloud 162 determines the non-customer-initiated command for an ECU software update will take up to 30 minutes to complete, but the current vehicle battery charge is low and only sufficient to supply the power for the update process for 20 minutes, the backend cloud 162 may reject to authorize the signed command. Alternatively, at operation 406, the backend cloud 162 authorizes to request with conditions. The conditions may include a time frame for the computing platform to perform the command. In addition, taking the above low battery example, the backend cloud may issue a conditional approval that the signed command may only be executed when the battery charge is above a certain level (e.g. 50%). The approval conditions may further include a geolocation boundary within which the signed command may be executed. For instance, emission regulations and laws vary from State to State. A non-customer-initiated command updating ECU and changing the vehicle emission may be permitted in some certain States but not the others.

At operation 408, the backend cloud 162 authenticates the non-customer-initiated command. For instance, the backend cloud 162 may verify the non-customer-initiated command is from an authorized party using IP address and/or digital signature verifications. The backend cloud 162 may further verify the non-customer-initiated command itself is authenticate and has not been compromised using digital signature technology. Responsive to a successful authentication, the backend cloud 162 generates a signed command and send the signed command along with authorization conditions back to the computing platform 104 at operation 410. As an example, the signed command may be generated using Rivest-Shamir-Adleman (RSA), or Elliptic Curve Digital Signature Algorithm (ECDSA) digital signature technologies. Responsive to receiving the signed command, the computing platform 104 executes the signed command following the authorization conditions attached to the signed command.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
 a controller, programmed to
  responsive to receiving a command from a non-customer party, send an authorization request based on the command and a predefined vehicle parameter to a server;
  responsive to receiving a signed command from the server, execute the signed command; and
  delay execution of the signed command midi the vehicle is not in use.

2. The vehicle of claim 1, wherein the controller is further programmed to distribute the signed command to an electronic control unit (ECU) of the vehicle.

3. The vehicle of claim 2, wherein a communication between the controller and the ECU is implemented via ISO 15762 standard.

4. The vehicle of claim 1, wherein the controller is further programmed to, responsive to receiving a request for an additional vehicle parameter from the server, collect the additional vehicle parameter and send the additional vehicle parameter to the server.

5. The vehicle of claim 1, wherein the predefined vehicle parameter includes at least one of: a vehicle identification number (VIN), a vehicle location, a vehicle battery charge level, or a vehicle software version.

6. The vehicle of claim 1, wherein the controller is further programmed to:
 receive a condition for execution of the signed command from the server; and
 execute the signed command responsive to occurrence of the condition.

7. The vehicle of claim 6, wherein the condition for the signed command includes at least one of: a time condition, a battery charge condition, or a geolocation condition.

8. The vehicle of claim 7, wherein the controller is further programmed to begin execution of the signed command within the time condition.

9. The vehicle of claim 1, wherein the controller is further programmed to, responsive to detecting the vehicle is not in use, execute the signed command.

10. The vehicle of claim 9, wherein the controller is further programmed to, responsive to predicting the vehicle will not be in use for at least a predicted execution time for the signed command, execute the signed command.

11. The vehicle of claim 10, wherein the controller is further programmed to generate a usage pattern of the vehicle.

12. A method for a vehicle, comprising:
detecting a non-customer-initiated command induced by a controller within the vehicle responsive to a pre-condition being met;
generating an authorization and authentication request based on the non-customer-initiated command;
sending the authorization and authentication request to a server;
receiving a signed command authorizing and authenticating the non-customer-initiated command;
executing the signed command;
receiving a time condition indicative of a time frame within which the signed command is authorized to be executed; and
resend the authorization and authentication request responsive to failing to execute the signed command within the time frame.

13. The method of claim 12 further comprising:
receiving a request for additional vehicle parameters from the server; and
sending the additional vehicle parameters requested to the server.

14. The method of claim 12, further comprising:
distributing the signed command to an ECU for execution.

15. The method of claim 12, wherein the signed command is generated using one of the following digital signature technologies: Rivest-Shamir-Adleman (RSA), or Elliptic Curve Digital Signature Algorithm (ECDSA).

16. A vehicle system, comprising
a controller programmed to,
responsive to receiving a data file wirelessly from a non-customer party, send an authorization and authentication request based on the data file to a server which is independent from the non-customer party,
responsive to receiving a signed command from the server, distribute the data file to an ECU, and
responsive to receiving a rejection from the server indicative of the data file being inauthentic, delete the data file and report an error event to a server.

* * * * *

UNITED STATES PATENT AND TRADEMARK OFFICE
CERTIFICATE OF CORRECTION

| | |
|---|---|
| PATENT NO. | : 10,834,199 B2 |
| APPLICATION NO. | : 16/133875 |
| DATED | : November 10, 2020 |
| INVENTOR(S) | : Karl Nathan Clark et al. |

It is certified that error appears in the above-identified patent and that said Letters Patent is hereby corrected as shown below:

In the Claims

Column 8, Line 32, Claim 1:
After "delay execution of the signed command"
Delete "midi" and
Insert -- until --.

Signed and Sealed this
Twenty-third Day of May, 2023

Katherine Kelly Vidal
*Director of the United States Patent and Trademark Office*